(12) United States Patent
Zubrin et al.

(10) Patent No.: US 8,652,402 B2
(45) Date of Patent: Feb. 18, 2014

(54) PORTABLE GAS GENERATING DEVICE

(71) Applicant: Pioneer Astronautics, Lakewood, CO (US)

(72) Inventors: Robert M. Zubrin, Golden, CO (US); David Kenneth Strott, Lakewood, CO (US); Anthony Muscatello, Rockledge, FL (US); Nicholas F. Jameson, Cedar Park, TX (US); Emily Bostwick-White, Wheat Ridge, CO (US)

(73) Assignee: Pioneer Astronautics, Lakewood, CO (US)

( * ) Notice: Subject to any disclaimer, the term of this patent is extended or adjusted under 35 U.S.C. 154(b) by 0 days.

(21) Appl. No.: 13/745,544

(22) Filed: Jan. 18, 2013

(65) Prior Publication Data

US 2013/0181168 A1    Jul. 18, 2013

Related U.S. Application Data

(63) Continuation of application No. 11/537,439, filed on Sep. 29, 2006.

(60) Provisional application No. 60/786,965, filed on Mar. 29, 2006.

(51) Int. Cl.
*A61L 9/00* (2006.01)

(52) U.S. Cl.
USPC .................................................. 422/4; 422/5

(58) Field of Classification Search
USPC .......................................................... 422/4, 5
See application file for complete search history.

(56) References Cited

U.S. PATENT DOCUMENTS

| | | | |
|---|---|---|---|
| 2,029,604 A * | 2/1936 | Bayer et al. | 422/631 |
| 3,581,504 A * | 6/1971 | Andrus | 60/259 |
| 3,603,284 A * | 9/1971 | Garnache | 118/725 |
| 4,018,573 A * | 4/1977 | Mentschel | 48/107 |
| 4,196,590 A * | 4/1980 | Fries | 60/496 |
| 4,273,560 A | 6/1981 | Kostka | |
| 4,352,782 A * | 10/1982 | Daly | 422/179 |
| 4,378,436 A | 3/1983 | Heine et al. | |
| 4,414,136 A * | 11/1983 | Convers | 502/225 |
| 4,830,604 A | 5/1989 | Korenberg | |
| 5,137,703 A * | 8/1992 | Lichtin et al. | 423/239.1 |
| 5,171,553 A | 12/1992 | Li et al. | |
| 5,314,673 A | 5/1994 | Anseth et al. | |
| 5,335,717 A * | 8/1994 | Chin et al. | 164/519 |
| 6,159,358 A * | 12/2000 | Mulvaney et al. | 208/46 |
| 6,171,570 B1 * | 1/2001 | Czuppon | 423/359 |
| 6,221,280 B1 * | 4/2001 | Anumakonda et al. | 252/372 |
| 6,272,846 B1 * | 8/2001 | Schneider | 60/218 |
| 6,301,891 B2 * | 10/2001 | Gray, Jr. | 60/616 |
| 6,347,627 B1 | 2/2002 | Frankie et al. | |
| 6,641,625 B1 | 11/2003 | Clawson et al. | |
| 6,753,294 B1 * | 6/2004 | Brisley et al. | 502/439 |
| 6,811,907 B1 | 11/2004 | Wang et al. | |
| 6,849,247 B1 | 2/2005 | Elstrodt et al. | |
| 6,994,930 B1 * | 2/2006 | Geisbrecht et al. | 429/425 |
| 7,229,675 B1 * | 6/2007 | Paderov et al. | 427/529 |
| 2005/0120703 A1 * | 6/2005 | Rohrbaugh et al. | 60/229 |
| 2006/0219097 A1 * | 10/2006 | Newman et al. | 95/262 |

* cited by examiner

*Primary Examiner* — Regina M Yoo

(74) *Attorney, Agent, or Firm* — Merchant & Gould, P.C.

(57) ABSTRACT

Methods and devices for generating gas from nitrous oxide are provided as well as downstream uses for the product gas. Reactor devices of the invention are compact and incorporate a novel heat-exchange/regenerative cooling system to optimize $N_2O$ decomposition and reactor durability.

10 Claims, 15 Drawing Sheets

DENSITY OF N$_2$O AS A FUNCTION OF TEMPERATURE

N$_2$O VAPOR PRESSURE AS A FUNCTION OF TEMPERATURE

*3.98% THERMAL DECOMPOSITION TIMES FOR $N_2O$ VS INITIAL GAS TEMPERATURE*

PORTABLE GAS GENERATING DEVICE

CROSS-REFERENCE TO RELATED APPLICATIONS

This application is a continuation of U.S. application Ser. No. 11/537,439, entitled "Portable Gas Generating Device", filed Sep. 29, 2006, which claims priority to U.S. Provisional Application Ser. No. 60/786,965, filed Mar. 29, 2006, entitled, "Method and Devices for Generating Gas from Nitrous Oxide," and is related to U.S. Pat. No. 6,347,627, each of which are incorporated by reference in their entirety.

This invention was made with Government support under Contract No. W31P4Q-04-C-R322 awarded by the U.S. Army. The U.S. Government may have certain rights in this invention.

FIELD OF THE INVENTION

The invention generally relates to a gas generating device and in particular to a portable gas generating device for production of high energy gas from nitrous oxide and to the uses thereof.

BACKGROUND OF THE INVENTION

Decomposition of nitrous oxide ($N_2O$) results in the release of oxygen, nitrogen, and a large amount of energy. Over the past several decades, groups have tried to optimize and capture the energy released from this decomposition reaction, thereby making it more practical for downstream use.

In particular, U.S. Pat. No. 5,137,703 describes a method for thermal catalytic decomposition of $N_2O$ into molecular oxygen and nitrogen using a variety of catalysts. U.S. Pat. No. 5,171,553 describes noble metal catalyst for the decomposition of $N_2O$ that provides increased reactivity when used on noble metal-exchanged crystalline zeolites. U.S. Pat. No. 5,314,673 describes a method for decomposition of streams of up to 100% $N_2O$ over a tubular reactor filled with cobalt oxide and nickel oxide on zirconia catalyst. Additionally, U.S. Pat. No. 6,347,627 describes a self-contained system for converting $N_2O$ to a breathable gas mixture.

One particularly attractive use for $N_2O$ is as an energy source in a propulsion system, e.g., monopropellant, bipropellant, etc. Liquid monopropellants are often used in propulsion systems where simplicity of design, restartable control on demand, and repeatability are desired. Conventional monopropellants include hydrazine and hydrogen peroxide, both of which are toxic and extremely dangerous.

There is a need in the art to replace hydrazine and/or hydrogen peroxide with a safer, but still effective energy source. In addition, there is a need in the art to more effectively optimize $N_2O$ decomposition, especially in a manner that provides portable, useful energy and high pressure gas, e.g., useful as an engine propellant for a rocket engine, a turbine, etc.

Against this backdrop the present invention has been developed.

DETAILED DESCRIPTION OF THE INVENTION

The present invention is directed to a compact and portable gas generator ("generator" herein) for production of high energy gas from decomposition of $N_2O$. Generator embodiments of the invention allow for the generation and control of large quantities of high energy gas. Generator embodiments are constructed to both raise the efficiency of $N_2O$ decomposition, thereby increasing the volume of gas and energy released, and enhances the durability of the generator itself, thereby decreasing the rate of generator failure. In addition, generator designs of the invention are highly portable; having a size per power output that vastly improves on existing power production technology. Finally, generator embodiments of the invention can provide combined uses, for example in one operational use the generated gas is used for propulsion and in another operational mode the generated gas is used as breathable air.

Particular embodiments of the invention provide a novel heat exchange design that facilitates transfer of heat from $N_2O$ decomposition in the generator to the incoming $N_2O$ reactants, thereby preheating the $N_2O$ to pre-decomposition temperatures and controlling the temperature of the generator itself. The heat transfer, therefore, increases the efficiency of $N_2O$ decomposition, while facilitating the durability of the generator, as the enhanced heat release (cooling) acts to protect the integrity of the metals used to fabricate the generator.

Generator embodiments of the invention are used as monopropellant engines; as part of bipropellant or hybrid engines; as buoyancy engines for underwater vehicles; as mono-propellant drivers for turbine emergency power units (EPUs); as sources for breathing gas, for mixed uses, i.e., propellant and breathable air, and for other uses as described below.

N₂O Decomposition

Figure 1:
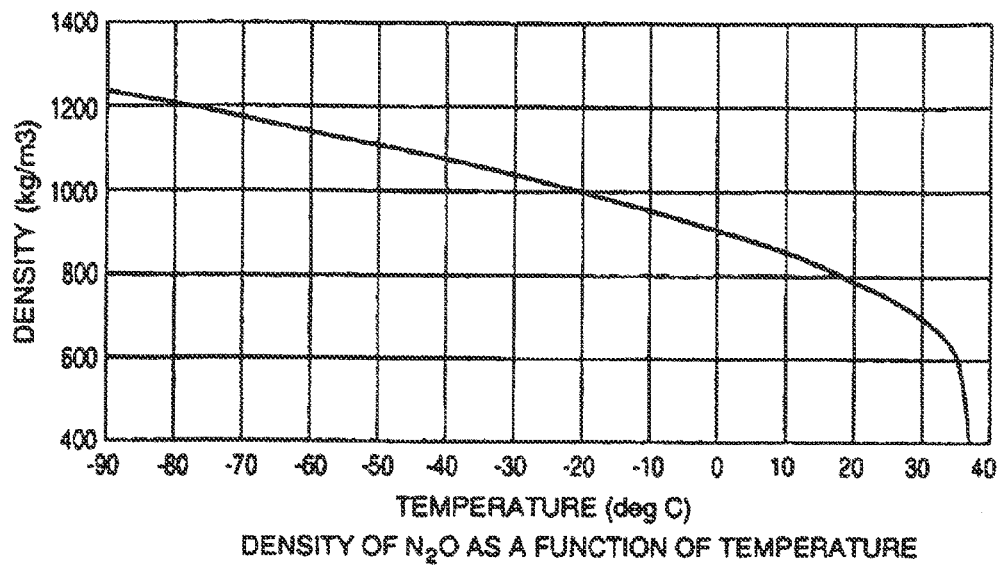
FIG. 1 is a graph showing the density of $N_2O$ as a function of temperature.
Figure 2:
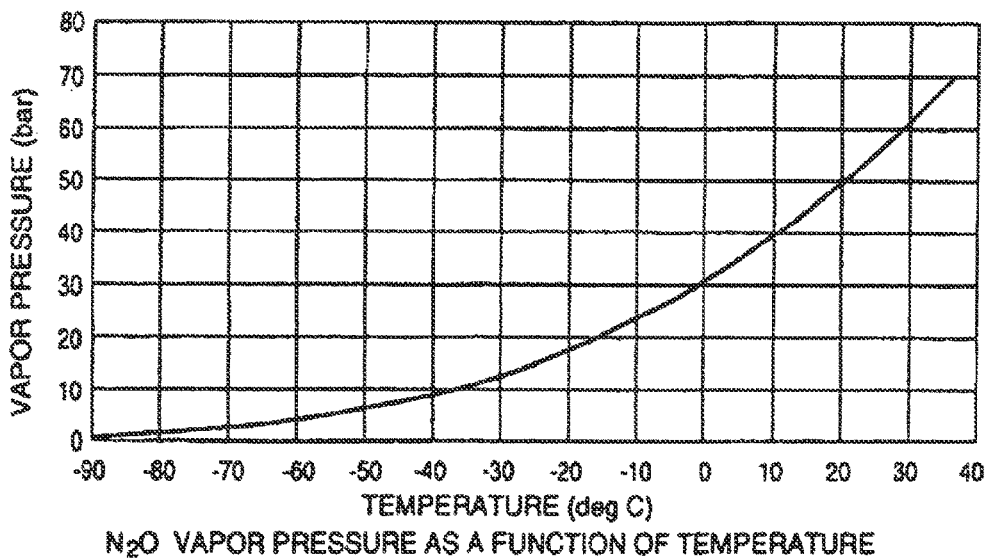
FIG. 2 is a graph showing the vapor pressure of $N_2O$ as a function of temperature.

Nitrous oxide, N₂O, is a common and inexpensive storable chemical that in the present invention is used as a convenient, low cost, lightweight, safe, and reliable source of high energy gas. N₂O is stored as a liquid at atmospheric pressure and about −90° C., or at ambient temperatures and about 50 bars pressure. The density and vapor pressure of liquid N₂O as a function of temperature are shown in FIGS. 1 and 2. When heated to a temperature of about 600° C., N₂O will spontaneously decompose to a gaseous mixture consisting of one-third oxygen and two-thirds nitrogen by mole. Use of a catalyst decreases the temperature at which the decomposition reaction occurs. As shown below, a large amount of energy is released during the decomposition reaction.

Nitrous oxide is an energy-bearing molecule, at 298 K, N₂O contains about 81.6 kJ/mole more enthalpy than molecular oxygen and nitrogen. Thus, based on the energy balance, N₂O is unstable and should spontaneously decompose to oxygen and nitrogen, according to reaction 1:

$$N_2O \rightarrow N_2 + \tfrac{1}{2}O_2 + 81.6 \, kJ \qquad \text{(Rxn 1)}$$

All that is required for Reaction 1 to proceed in the forward direction is sufficient kinetic activity to allow the decomposition to proceed. This decomposition will occur in the gas phase and almost to completion at about 600° C. (or at lower temperatures when an appropriate catalyst is present).

The overall enthalpy of reaction for N₂O is 1855 kJ/kg. Including the heat of vaporization loss of 376 kJ/kg, the resultant available thermal energy release from liquid (L) N₂O is 1479 kJ/kg (410 Whr/kg). Twenty percent of the decomposition energy of N₂O is required to vaporize the liquid propellant.

As shown in the examples below, N₂O is able to provide specific impulse (Isp) performance comparable to current industry standard monopropellants, such as hydrazine and hydrogen peroxide. In addition, N₂O is a substantial improvement over a cold compressed gaseous nitrogen system which is used for propulsion for various reaction control systems. As such, the potential energy from N₂O decomposition is equal to the materials currently in use in most monopropellant engines (rocket, turbine, etc.), i.e., comparable or better than hydrazine, hydrogen peroxide and gaseous nitrogen.

It should also be noted that due to nitrous oxide's freezing point (−90.8° C., Baker, 1971) it is highly useful in extreme cold conditions, for instance, deep-space-storage and operation. This is compared to hydrazine and hydrogen peroxide which have freezing points of 2° C. and 1° C., respectively. N₂O is also useful when the temperature is extremely warm due to its high thermal stability. As such, N₂O for these additional reasons is a superior reactant for generator use under extreme conditions, e.g., space, underwater exploration, thermal pools, etc.

Various catalysts can be included in N₂O decomposition reactions of the present invention. Catalysts reduce the temperature required to decompose the N₂O. A suitable catalyst must survive the high temperature and oxidizing environment of the reaction. Several catalyst have been identified herein that show substantial ability to lower the N₂O decomposition temperature while surviving for a long enough interval to make economic sense. These catalysts include rhodium, ruthenium, platinum, nickel, zirconia, magnesia and copper. In preferred situations, the catalyst is coated onto an appropriate substrate, for example, alumina, zirconium oxide, or magnesium oxide (the substrate acting as a support and to extend the life of the catalyst coating).

Generator Embodiments

Generator embodiments of the present invention are designed to optimize the release of energy from nitrous oxide decomposition and to maximize the durability of the generator for sustained and long-term use. In addition, generators of the present invention have been optimized to maximize energy release for size of the device; this facilitates the production of cost effective and highly portable generator devices.

In one embodiment, the generator accomplishes these substantial benefits by providing a highly compact heat-exchange zone within the generator for pre-heating the incoming N₂O (making the decomposition reaction substantially more efficient) while simultaneously cooling the generator parts by release of heat from the reaction chamber (protecting the generator parts from the extreme temperatures of the N₂O decomposition).

Figure 3:
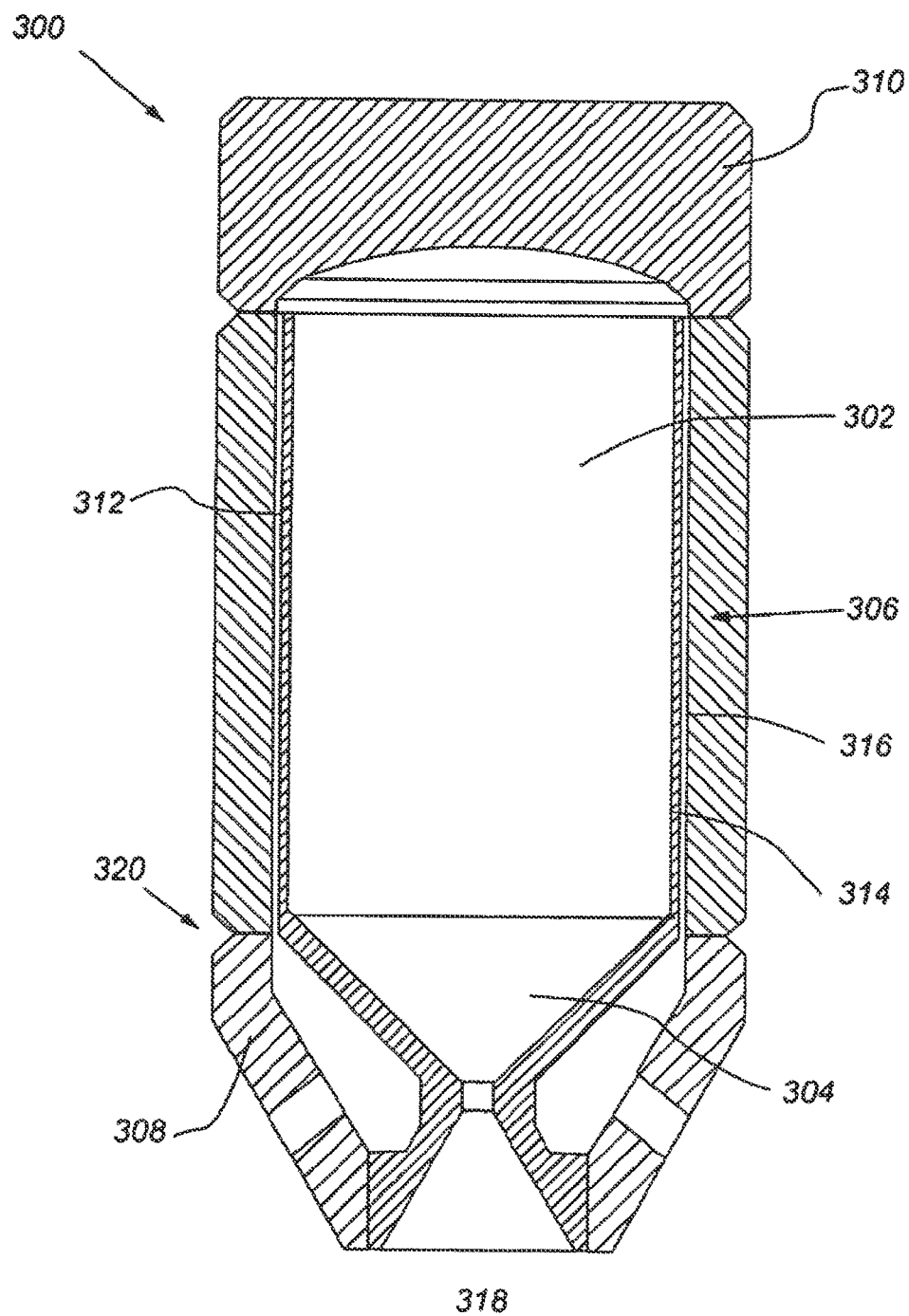
FIG. 3 is a cross-sectional view of the $N_2O$ generator in accordance with one embodiment of the present invention.

A cross-sectional view of one embodiment of the generator is shown in FIG. 3. The generator 300 includes generally: a reaction chamber 302 operatively connected to an exit chamber 304, an exterior jacket 306 that envelops the reaction chamber; an injection cone 308 that envelopes the exit chamber 304; and a cap 310 for operatively connecting the exterior jacket 306 to the reaction chamber. As discussed in more detail below, a gap 312 exists in the jacket, the gap including one or more channels provided between an interior wall 314 and exterior wall 316 of the reactor chamber 304. The gap provides a constrained space by which N₂O flows from the exterior of the generator 318 (source of N₂O) into the reaction chamber for decomposition and release of gas. The gap 312 in the exterior jacket 306 provides a heat exchange area in which N₂O is preheated during transit from its entry point into the generator 300 to where it decomposes within the reaction chamber 302.

At one end of the reaction chamber, the cap 310 acts to divert N₂O flowing within the gap 312 to a release point in the reaction chamber 302. At the opposite end of the reaction chamber an exit chamber may be operatively connected. The exit chamber 304 is enclosed by the injection cone and is for release of the gas generated within the reaction chamber to the exterior 318 of the reactor. The exit chamber 304 is shown enveloped by the injection cone. Note that an exit chamber is especially useful when the generator is used to produce high energy gas for rocket applications. The exit chamber, however, is not required in generator uses that do not require constrained or concentrated release of the high energy gas. Embodiments shown herein typically include the exit chamber, but note that this feature is optional.

In one embodiment, the generator has an overall cylindrical shape with dimensions from about 1 to about 3 inches (in) in diameter and about 1 to about 6 inches in height. Reactor chambers 302 within the generator typically have volumes of from about ½ to about 12 cubic inches which tends to provide sufficient gas/energy for most uses. In particular, a reactant volume of from about 1 to about 6 cubic inches is envisioned for use in most "engine" embodiments. Reaction chamber wall 314 thickness is also variable, but is typically from about 0.05 to about 1 inch in thickness. Other generator size dimensions are envisioned to be within the scope of the application as long as the generator functions as described herein are maintained.

Still referring to FIG. 3, the reaction chamber 302 is sufficient to allow decomposition reactions of N₂O and in some embodiments house a sufficient amount of catalyst to allow for the generation of gas and energy as described herein. A partition 320 is shown positioned between the reaction chamber 302 and the exit chamber 304 to constrain the reactants and catalyst within the reaction chamber. In embodiments where catalysts are not included in the reaction chamber, a partition is not always required.

In one embodiment, the partition 320 can be a screen or other like device having a series of openings (see FIG. 8) that fluidly connect the reaction chamber 302 to the exit chamber 304. High energy gas from $N_2O$ decomposition passes from the reaction chamber into the exit chamber via the openings within the partition 320. The openings may be in the form of holes, slits, or other like apertures. Typically, partition 320 embodiments are fabricated from materials having high thermal stability, i.e., very low to no thermal expansion coefficient. For example, materials like zirconia foam and sodium zirconiam phosphate.

Figure 4:
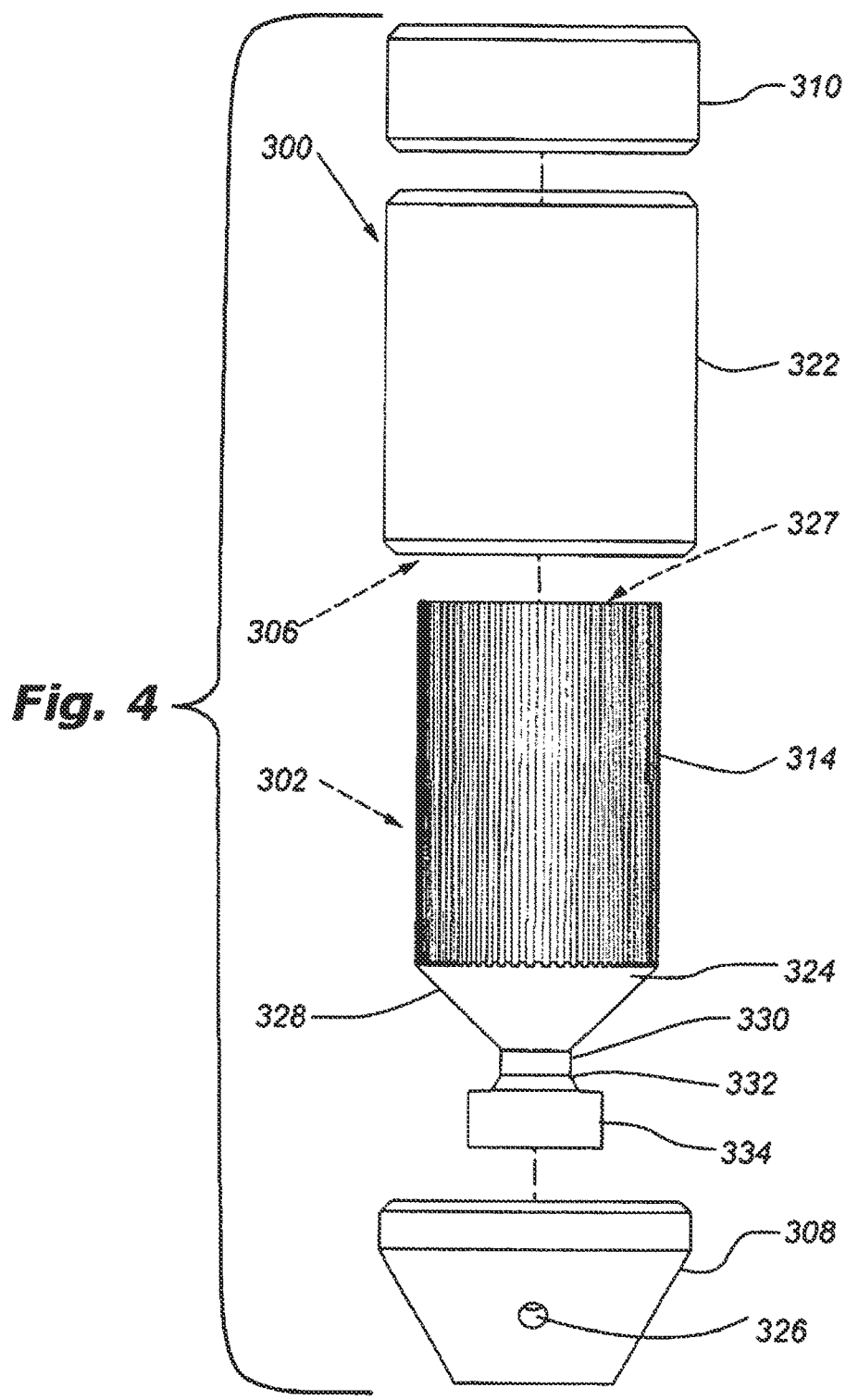
FIG. 4 is an exploded view of the $N_2O$ generator in accordance with one embodiment of the present invention.

FIG. 4 shows one embodiment of an exploded view of a generator 300 embodiment including the reaction chamber inner wall 314, generator outer wall 322, reactor cap 310, nozzle wall 324 and injection cone 308. The reactor chamber inner wall and exterior wall (inner side of generator outer wall) combine to form jacket 306.

An injection port 326 is located through the injection cone 308 connecting the gap formed between the interior and exterior chamber walls with the exterior of the generator. (See FIG. 3). In one embodiment, the injection port 326 is located distal to an entry port 327 of the reaction chamber 302 to thereby maximize heat-exchange between the $N_2O$ flowing within the gap 312 and heat released from the reaction chamber. Also note that the nozzle wall 324 defines a convergence zone 328 for concentrating the released gas from the chamber, a throat zone 330 for controlling the flow rate of gas from the chamber and a divergence zone 332 for maximizing the exhaust velocity of the gas. Optionally, a collar 334 can provide an attachment for downstream plumbing useful with the present invention.

Figure 5:
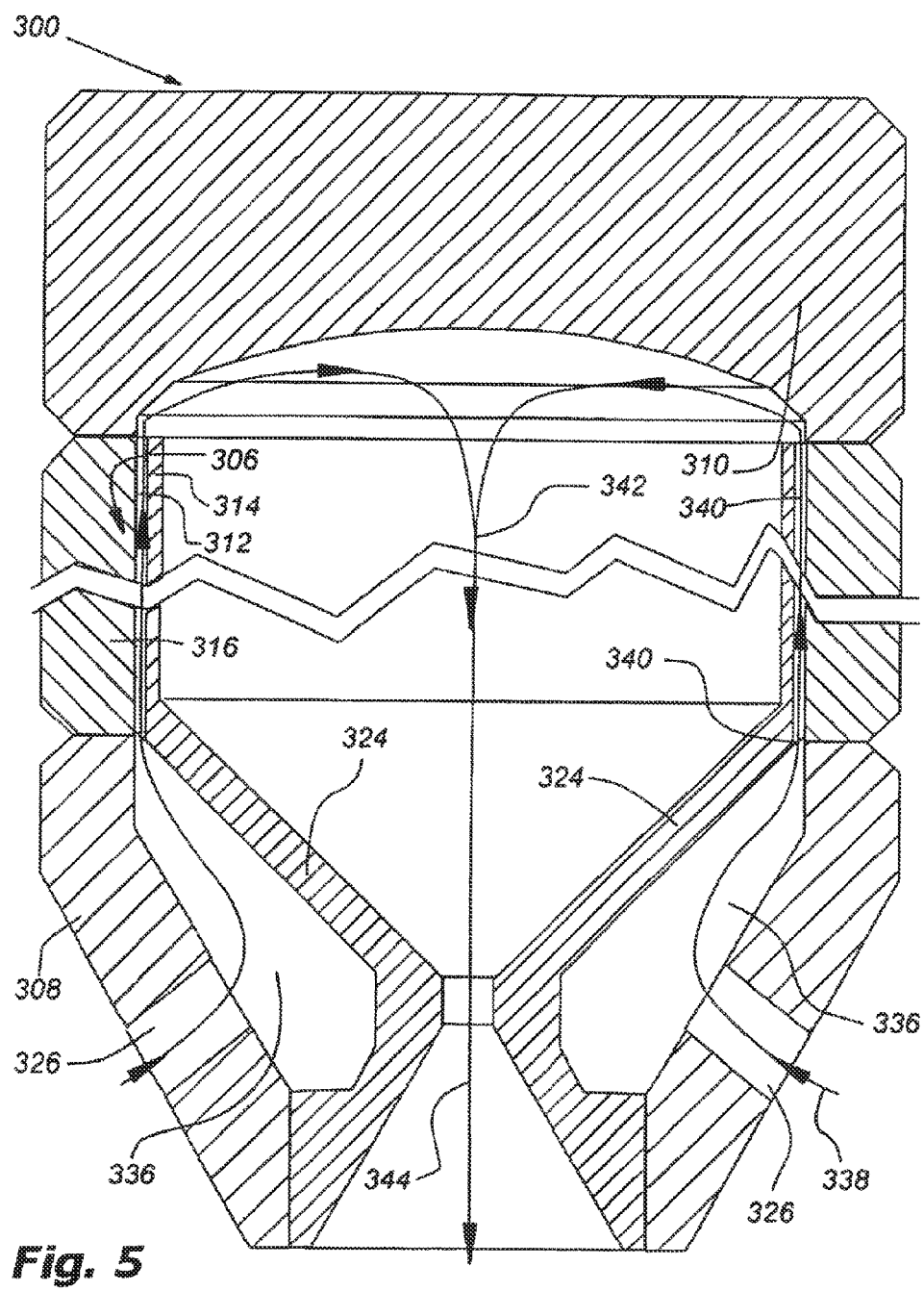
FIG. 5 shows the flow direction of $N_2O$ through a cross-sectional view of an embodiment of the generator in accordance with the present invention.

Referring to FIG. 5, one embodiment of $N_2O$ flow direction is shown within the generator 300. $N_2O$ is injected into the generator via one or more injection ports 326, the fluid flows into a channel 336 formed between the injection cone 308 and the nozzle wall 324. $N_2O$ is injected either as self pressurized gas or as a liquid. Note that the nozzle wall is typically continuous with the inner reaction chamber wall 314.

In one embodiment, the one or more channels defined within the gap 312 are formed substantially the entire length of the jacket 308 formed by the interior 314 and exterior 316 walls of the reaction chamber. The channels can be straight, zigzagged, spiral, non-uniform or the like. Channels can be of various useful dimensions, for example can be formed as cross-sectional U-shapes, circular shapes, square shapes, as well as other like geometries. In addition, it is envisioned that the channel(s) can be a uniform or non-uniform dimension that travels over some or all of the surface of the reaction chamber inner wall 314 and or surface of the nozzle wall 324.

The $N_2O$ that flows along the length of the reaction chamber is typically heated from about ambient temperature to about 700° C. Once the $N_2O$ reaches the reactor cap 310 it is passed into the reaction chamber 302 for decomposition. The movement of $N_2O$ over and through the generator provides the regenerative cooling of the present invention, as new reactant is constantly flowing through the generator jacket while the heated $N_2O$ is decomposed within the reaction chamber to produce the gas/energy of the device.

As such, and still referring to FIG. 5, $N_2O$ follows the general direction of the arrows in the figure, from the injection port (see arrow 338) within the gap, and within the jacket (see arrow 340) to the reactor cap, and ultimately to the reaction chamber (see arrow 342). Gas is released from the reaction chamber in the direction of arrow 344 through the exit chamber.

Figure 6:
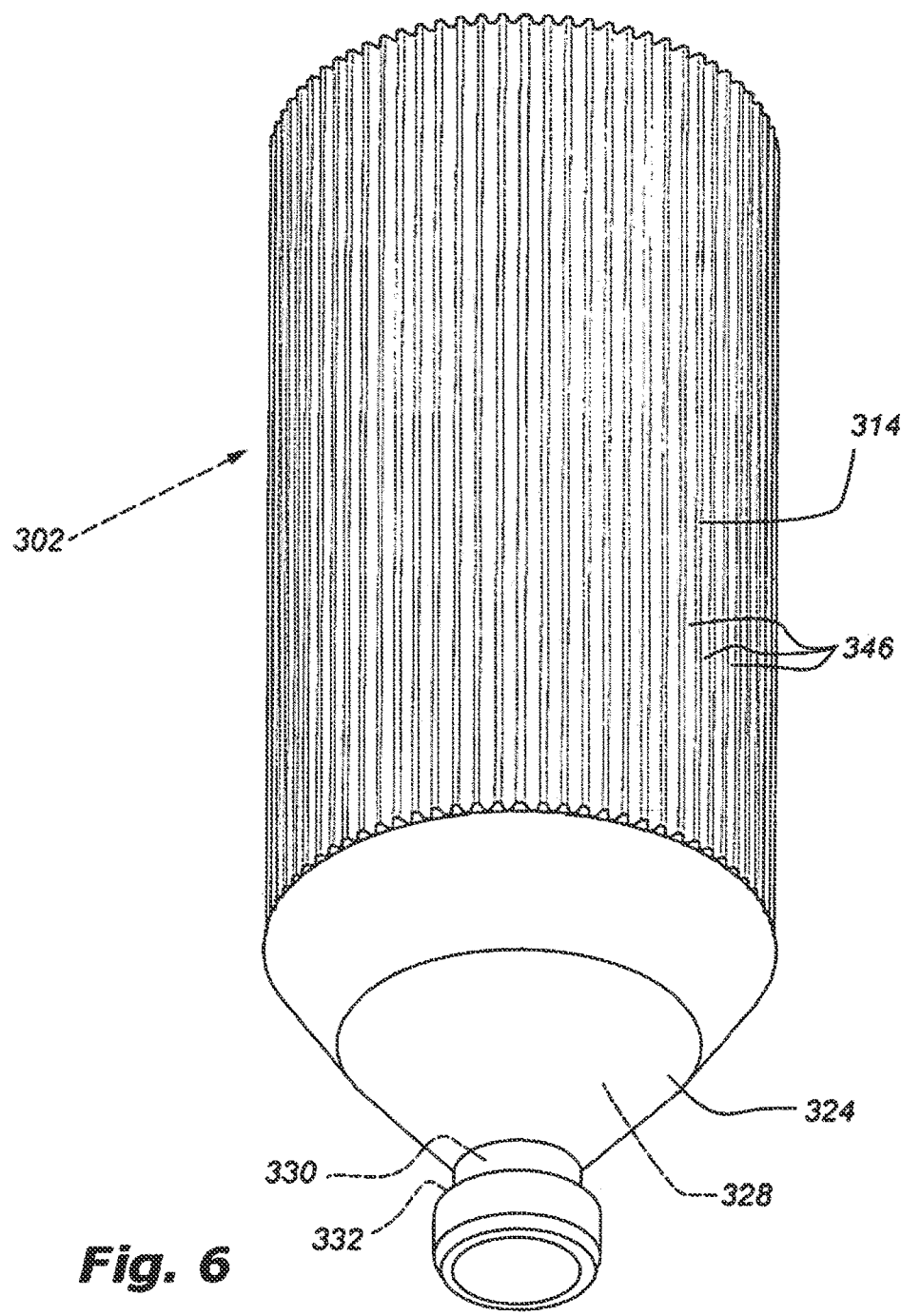
FIG. 6 is a perspective view of the reaction chamber and nozzle in accordance with one embodiment of the present invention.

FIG. 6 provides a perspective view of one embodiment of the interior wall 314 of the reaction chamber 302. In this embodiment, one or more channels 346 are defined by a series of grooves along the length of the exterior surface of the interior chamber wall 314. The grooves are formed to increase surface area of fluids along the surface of the wall 314, but as can be understood by one of skill in the art (and as discussed above) other shaped channels can be substituted, e.g., V-shaped channels, circular-shaped channels, etc. Note that grooves in this embodiment are direct, but could be zigzagged, spiral or other like shape. The time $N_2O$ spends within the channel 346 in route to the reaction chamber 302 is important and is dependent on the length of the channel, the flow rate of the $N_2O$ and the volume of the channels. $N_2O$ that spends too little time prior to reaching the reactor chamber 302 can quench the reactor, i.e., due to the $N_2O$'s insufficient temperature. However, $N_2O$ that heats-up too much in the channels will begin the decomposition reaction prematurely, leading to high energy gas release within the jacket and thereby leading to generator failure. Therefore, generator embodiments of the invention are designed to coordinate the length of time the $N_2O$ is heated, i.e., the $N_2O$'s temperature, within the channels prior to reaching the reaction chamber. Note the exit zones: convergence, 328, throat 330 and divergence 332.

Figure 7:
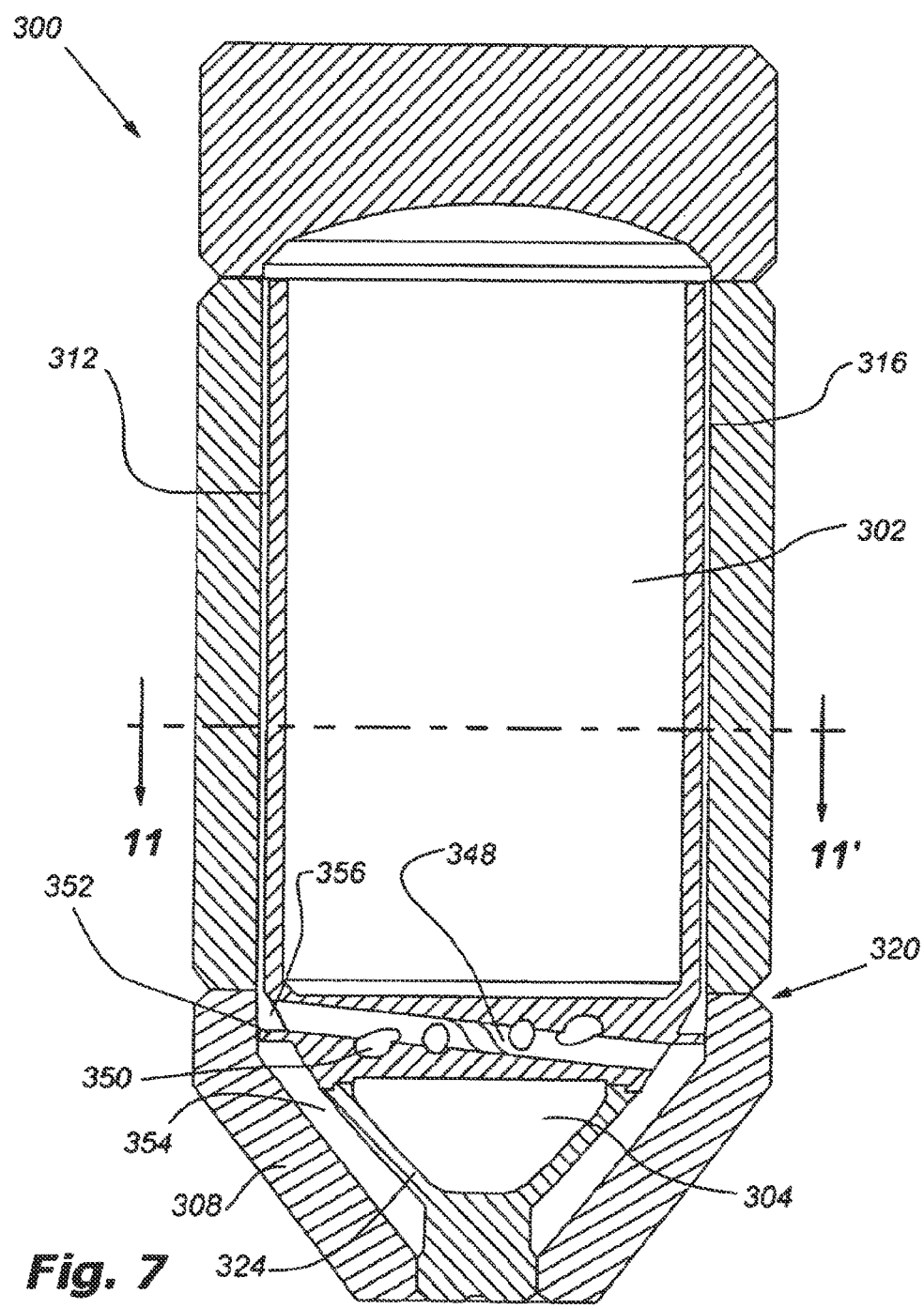
FIG. 7 is a cross-sectional view of the $N_2O$ generator in accordance with an alternative embodiment of the present invention.
Figure 8:
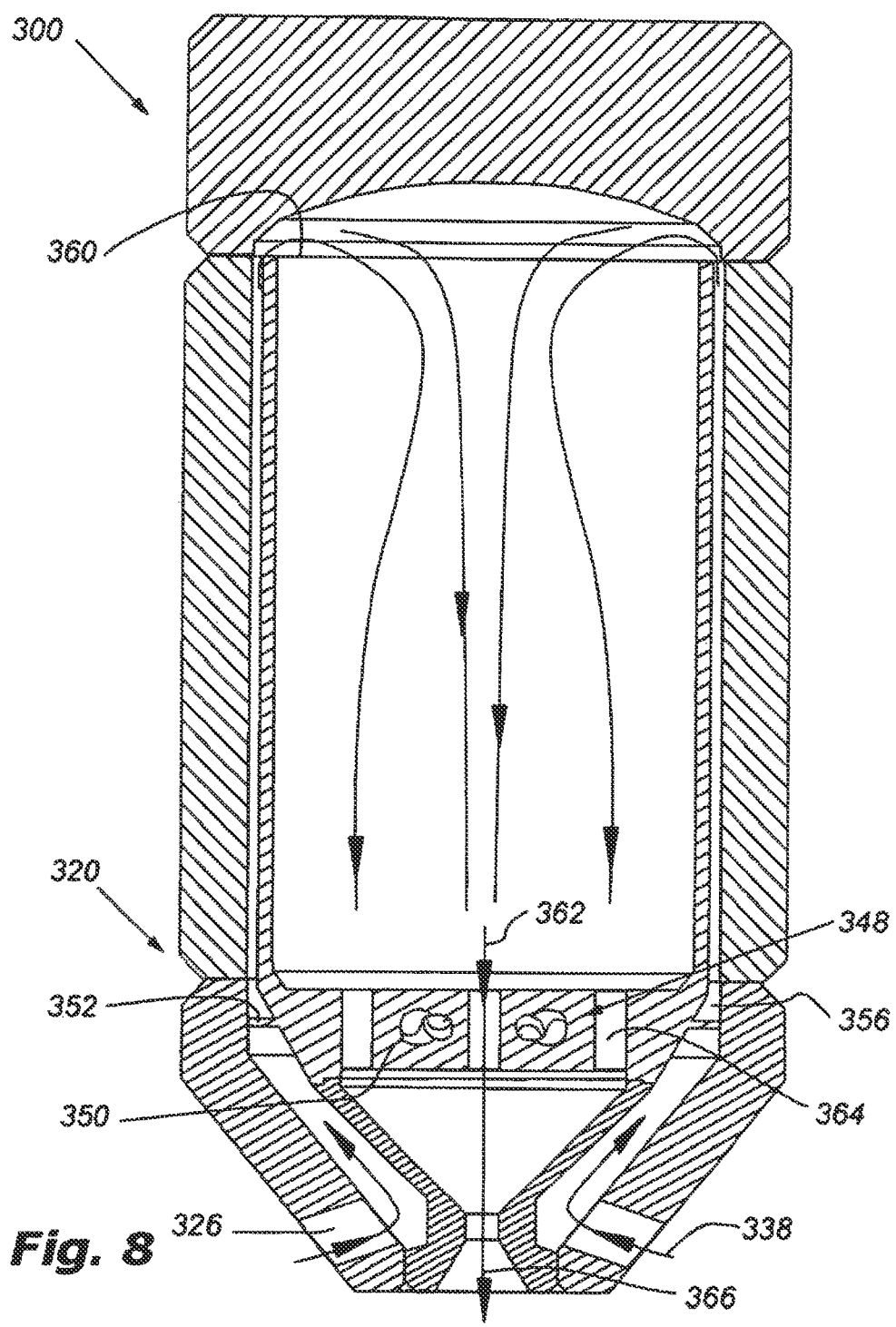
FIG. 8. shows the flow direction of the $N_2O$ through a cross-sectional view of an embodiment of the generator in accordance with the present invention.

FIGS. 7 and 8 provide an alternative embodiment of a generator 300 of the present invention. In this embodiment, the partition 320 between the reaction chamber 302 and exit chamber 304 is a screen 348 having a series of internal channels 350 that transversely criss-cross the diameter of the screen. The channels 350 within the screen are designed to force the $N_2O$ entering the generator 300 to come from the entry port 326 (see FIG. 8) along the nozzle wall 324 (between the nozzle wall 324 and injection cone 308) and then go transversely through the screen 348 before re-entering the gap 312 on the other side of the screen. Note that a flange 352 (see FIG. 8) or other like obstruction prohibits the $N_2O$ from bypassing the screen. The flange 352 radially extends from the screen to contact the exterior wall 316 or injection cone 308, thereby separating the channels 354 prior to the screen from the channels 356 after the screen.

FIG. 8 illustrates a flow configuration through this embodiment by showing arrow 356 where the $N_2O$ enters the generator traveling between the nozzle wall and injection cone. Arrow 358 shows the flow of $N_2O$ across the screen and up along the channels formed in the interior chamber wall 324. $N_2O$ is then diverted by the interior of the reactor cap into the reaction chamber. (See arrow 360) As the $N_2O$ decomposes, high energy gas exits the reaction chamber via a series of openings 364 in the screen into the exit chamber (See arrow 362). High energy gas ultimately exits the generator as shown by arrow 366.

Figure 9:
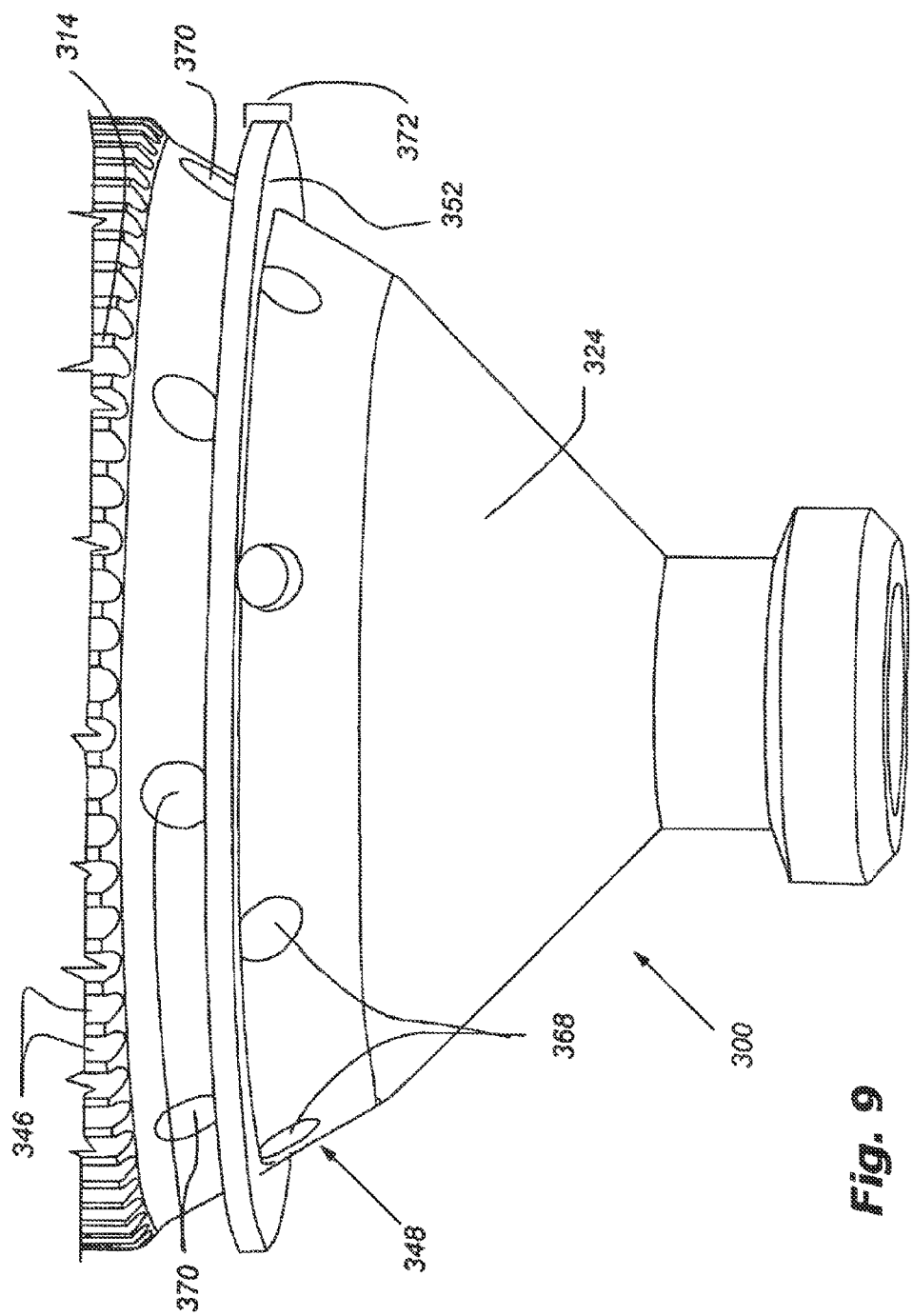
FIG. 9 is a perspective view of the screen and nozzle in accordance with one embodiment of the present invention.

FIG. 9 provides an expanded perspective view of the screen 348 and nozzle of the generator 300 according to an embodiment of the invention. $N_2O$ enters into the transverse channels 350 (see FIG. 7 & FIG. 12) of the screen via channel openings 368, exits the screen via channel exits 370. This design compels $N_2O$ to move from the injection port side of the screen itself, through the screen, and into the grooves along the surface of the reactor chamber wall 324. In general, the transverse channels through the screen connect a first end of the channel on the entry side of the flange 352 to a second end of the channels on the exit side of the flange. As such, the channels cut transversely through the screen 348 at an angle sufficient to cross the thickness of the flange (See bracket 372).

Figure 10:
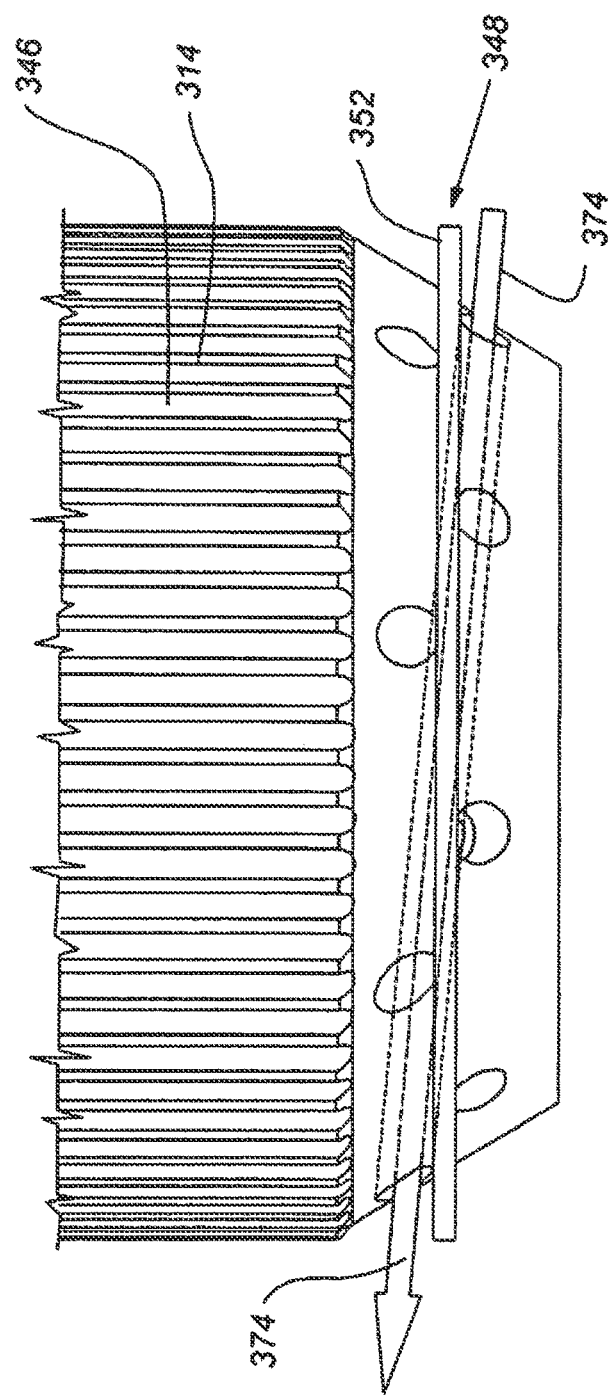
FIG. 10 is a side view of $N_2O$ flow direction through a screen embodiment in accordance with the present invention.

FIG. 10 is a perspective view of $N_2O$ flowing through a screen 348 embodiment of the invention (see arrow 374), $N_2O$ flowing through the screen is preheated by the escaping gas via openings 364. (See FIG. 8), which serves as a superior heat exchange element, within the screen 348 itself. This embodiment can allow for further compaction of the generator as $N_2O$ can be preheated in the screen 348. In addition, the cooling provided by the flowing $N_2O$ within the transverse channels 350 protects the integrity of the screen. The escaping gas from the reaction chamber places an extreme burden on the integrity of the screen itself, so the regenerative cooling of the screen limits damage and increases durability of the screen and therefore the generator. The regenerative cooling aspect of the screen allows for use of metals for screen components.

Note that other generator configurations can be used, for example, the grooves being milled into the exterior chamber wall 316 of the jacket 308, and having a smooth outer surface of the interior chamber wall. The main issue being to provide heat-exchange zones for preheating the $N_2O$ and cooling the decomposition reaction within the reaction chamber. Note also that both the interior and exterior chamber walls forming the jacket can be smooth, essentially forming one channel.

Figure 11:
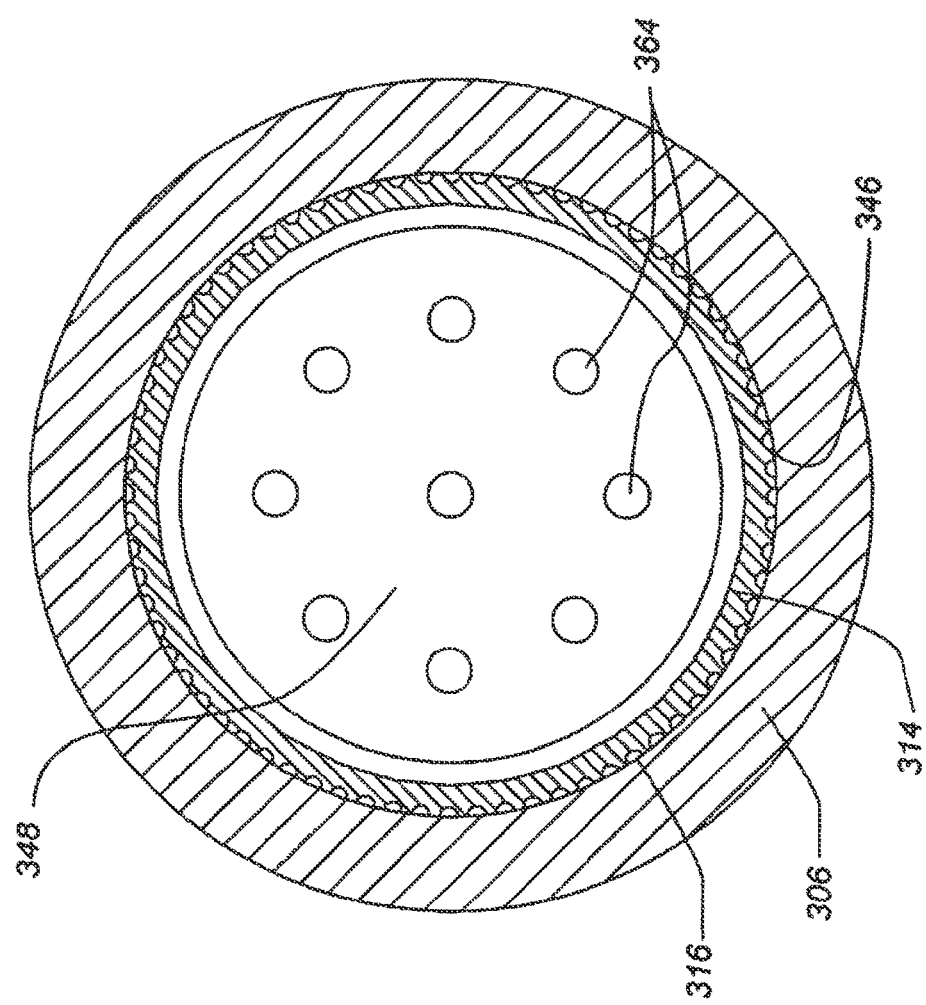
FIG. 11 is a top view of the screen in accordance with one embodiment of the present invention.

FIG. 11 is an illustrative cross-sectional view along line 11-11' of FIG. 7. Note the "release" openings 364 in the screen 348 for release of gas out of the reaction chamber 302. The orientation of the openings can be of any useful layout as long as there is sufficient capacity to release the gas from the reaction chamber into the exit chamber 304. It is also noted that various numbers of openings can be used to accomplish this feat. Still referring to FIG. 11, grooves defined in the interior chamber wall 314 of the reaction chamber 302 are shown in the jacket 306. Note that the grooves and exterior chamber wall 316 form a seal to ensure consistent pressure on the $N_2O$ moving along the chamber toward the reactor cap. There is no mixing of $N_2O$ between channels in this design. However, it is envisioned that the fluid within the channels could be mixed with little practical effect on the generator's performance.

Figure 12:
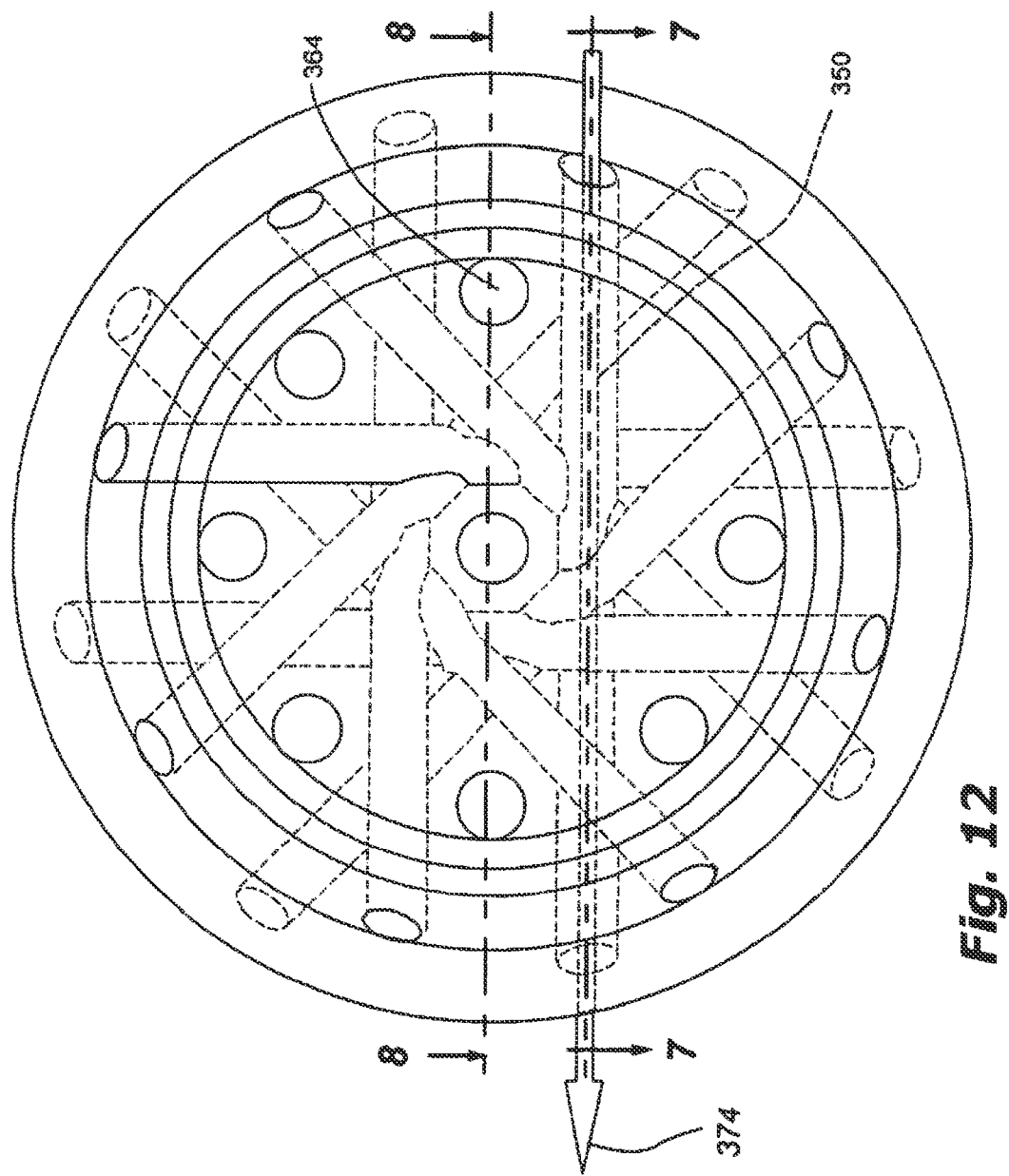
FIG. 12 shows the flow direction of the $N_2O$ and openings through a screen of one embodiment in accordance with the present invention.

FIG. 12 shows the juxtaposition of the $N_2O$ release openings 364 versus the transverse channels 350 through a cooled screen 348 embodiment of the invention. Note that other configurations can be used as long as heat transfer/regenerative cooling and generator function are maintained. There is no set number of transverse channels through the screen, although 4 to 12 are typical. There is no set number of release openings through the screen, although 9 are typical.

Note that while the previous discussion has centered on generator designs using flow in the jacket gap in the direction counter to the glow within the reaction chamber, alternative embodiments are possible, including designs in which the flow in the jacket gap and reaction chamber are in the same direction or coaxial entering the chamber radially from all sides.

Generator Manufacture

Generator embodiments of the invention are typically fabricated from nickel, steel, or other like metal. Nickel surfaces can further be coated with MgO to provide further resistance to oxidation and damage caused by the $N_2O$ decomposition.

With regard to catalyst, preferred embodiments include a catalyst bed constrained within the reaction chamber for facilitating $N_2O$ decomposition. Catalysts are typically incorporated into the chamber by being placed within prior to welding or held in place by a flange or hinge that can be opened repeatedly.

Generator Use

In order for embodiments of the present invention to function as a compact system, the generator is cooled, preferably regeneratively cooled, and the nitrous feed preheated to ignition temperatures before being injected into the catalyst bed. Potential catalysts include rhodium, ruthenium, platinum, nickel, iridium, zirconia, magnesia and copper, all on appropriate substrates such as alumina, zirconium oxide, or magnesium oxide. If it is not so preheated, the injection of large amounts of cool nitrous into a relatively small bed will cool the bed to below reaction temperatures, quenching the generator. These requirements are met in principle by using the nitrous feed as a regenerative coolant, feeding it into the reaction chamber via a jacket around the chamber, as illustrated schematically in FIGS. 3-11. In this way, the feed nitrous is preheated while simultaneously cooling the generator.

Although not specifically shown herein, other cooling embodiments are envisioned to be within the scope of the present invention. For example, diluents can be included into the $N_2O$ feed prior to decomposition within the reaction chamber. Diluents would essentially "water" the reaction down so that lower temperatures would be attained during the decomposition reaction. Diluents of the invention include a $N_2O$ miscible material like $CO_2$ and/or $N_2O$ non-miscible materials like $H_2O$. So, for example, $CO_2$ can be combined with the $N_2O$ prior to addition within the generator to "water down" the decomposition reaction to a level required for the particular use. This would thereby lower the maximum temperature of the generator and increase the durability of the generator due to the decreased temperature of the gas being produced. With regard to water, the water could be sprayed into the reaction chamber via an entry point separate from the $N_2O$. Water can be moved into the generator via gas pressure or using pumps. Other cooling embodiments include a separate jacket for moving water or other like liquid over the reaction chamber wherein the heater water is discharged from the generator once it attains a predetermined temperature.

In one illustrative embodiment, $CO_2$ is combined with the nitrous feed. $CO_2$ and $N_2O$ are miscible, and since $CO_2$ is inert, its presence lowers the overall generator system temperature. For example, addition of approximately 10% $CO_2$ to a stream of $N_2O$ will lower the temperature of released gas by about 200° C.

In an alternative embodiment where water is used as an injected coolant the water is not miscible with $N_2O$, so that a separate feed system is required. However as water does not react with room temperature $N_2O$, $N_2O$ gas can be used as a pressurant to drive the water injection. Water can be used as a coolant by flowing it through cooling channels or spraying it directly into the reaction chamber.

In use, the generator is started by preheating the reaction chamber to a sufficient temperature, about 700° C. is typical. Preheating of the chamber is accomplished by electrical, chemical and other like heating means. In an illustrative manner, heat tape can be wrapped around the generator which can be used to electrically preheat the chamber. In addition, separate reactors can be included in the generator or separate from the generator to provide heat to the $N_2O$ reaction chamber. These separate reactors can accommodate a solid pyrotechnic device (black powder, cordite, etc), or a fuel source like gasoline, methane, hydrogen, propane or other reactants that will ignite in combination with an oxidizer, such as air, oxygen or $N_2O$. The energy released from these separate reactions is then released into the $N_2O$ reaction chamber (not shown). In addition, a small amount of $N_2O$ dissociation in a small generator can be used to generate hot gas to heat the larger reaction chamber volume of a large generator.

In some uses, a catalyst is added to a bed within the reaction chamber that can survive the high temperature and oxidizing environment of the generator's operation, this will allow the temperature required to cause nitrous reaction in the bed to be lower than the temperature needed to cause reaction in the (uncatalyzed) jacket. The difficulty associated with this approach is that the catalysts that can survive the reactor's high temperature oxidizing environment are not always strong, i.e. not so effective at lowering minimum reaction temperature, and so the operating margins associated with this approach used alone can be narrow.

Figure 16:
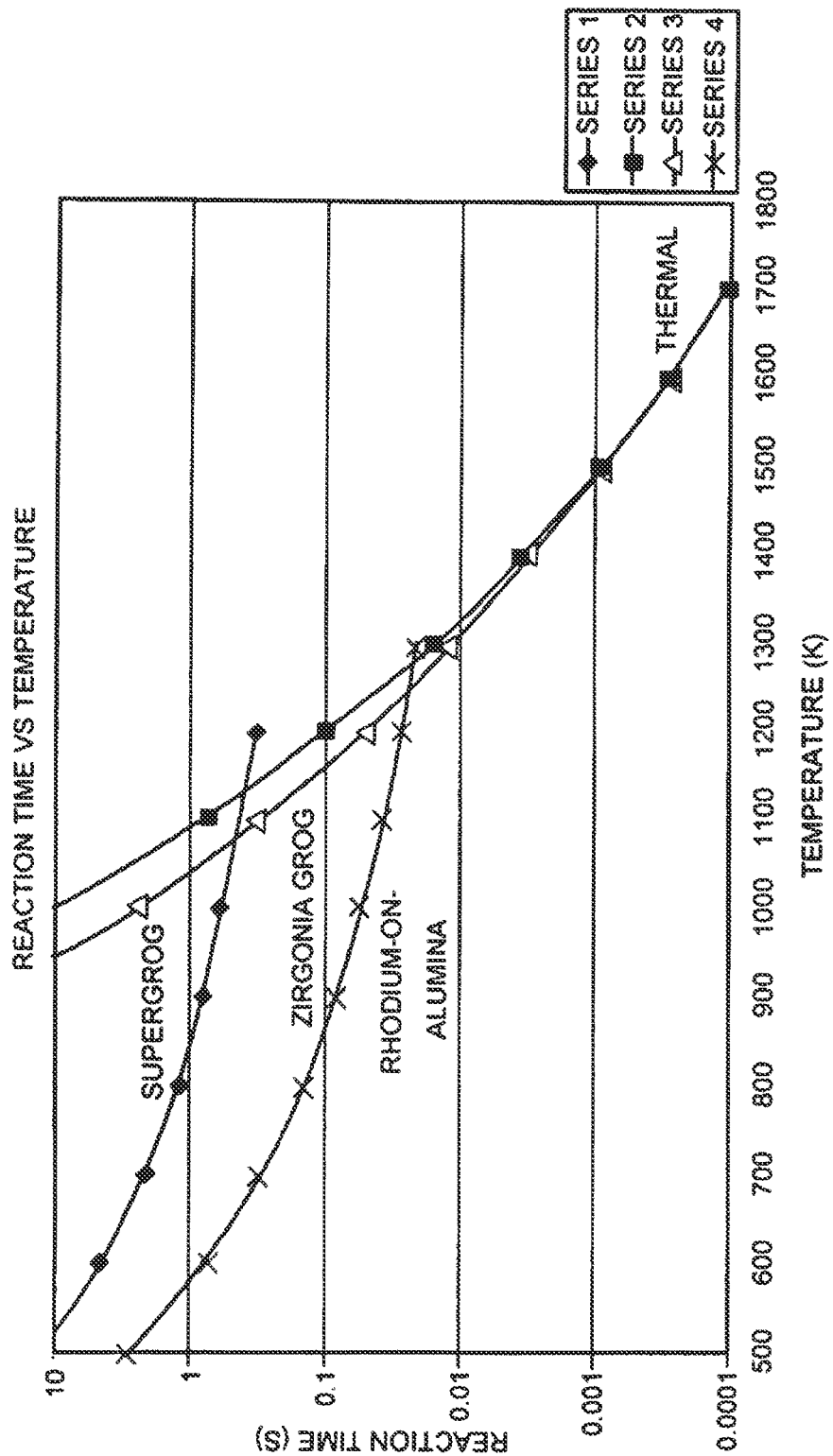
FIG. 16 illustrates the reaction time for $N_2O$ as a function of temperature in the presence of various catalysts.

In alternative uses, the generator is designed to have a jacket that minimizes the time that the coolant spends in the jacket (residence time) so radically that the nitrous does not have time to react before it is injected into the bed. The reaction time for nitrous oxide as a function of temperature in the presence of various catalysts is shown in FIG. 16.

In general, for generator failure to be avoided, the $N_2O$ jacket residence time must be kept shorter than the $N_2O$ reaction time. This generator design can be challenging, because the nitrous oxide must simultaneously spend enough time in the jacket to warm up. These two conflicting requirements are reconciled by machining the jacket in such as way as to maximize its heat transfer area, thereby allowing a great deal of nitrous heating to occur within a very short residence time. In one particular design, a generator is built with a total mass flow of 25 gm/s, the jacket interior volume is kept to 2.99 $cm^3$, which limits the residence time of the fluid in the jacket to less than 3.5 milliseconds. This is much shorter than 50 millisecond reaction time that might be expected if the fluid in the jacket were to reach 900° C., so exothermic reaction of the fluid in the jacket will not occur. In order to assure sufficient preheating in this design, 40 grooves with a total surface area of 75 $cm^2$ are milled into the jacket.

For best operation, both of the above embodiments (catalyst and limited gap residence time) are typically used in combination.

Another challenge addressed to enable durable $N_2O$ generators of the invention is material compatibility. Hot nitrous, and its dissociation products, create an oxidizing environment that can be quite damaging to most metals. The present invention provides that nickel is fairly resistant to this environment, enabling the operation of such generators for considerable time before potential failure. Nickel also has the advantage of being much more thermally conductive than most metals (it is four times as conductive as stainless steel) thereby making it a good material for use in a regenerative cooled embodiment which must transfer heat quickly away from the reaction chamber. In addition, materials can be used to coat and protect the nickel from the extreme environments of the interior of the generator. For example, nickel has a thermal expansion coefficient which is nearly identical to that of magnesium oxide (MgO). MgO in turn has a melting point above 3000 K, and is highly resistant to oxidizing atmospheres to at least 2500 K. The MgO is therefore used, in some embodiments, to coat the nickel and thereby protect the nickel from the extreme environment within the generator. The MgO also is so tightly bound that it will not react with the nickel, i.e., where MgO is coated on nickel. As such, embodiments of the generator include coating parts of the reactor in MgO.

By making use of various combinations of the innovations of nitrous regenerative cooling, high temperature oxidation resistant catalysts, minimum residence time cooling jackets, specially machined high heat-transfer area cooling jackets, nickel construction, and potentially inert fluid injection and MgO protective coatings on high temperature nickel parts, as required, the present invention is enabled.

The generator embodiments of the present invention provide $N_2O$ as a means of generating large quantities of high energy gas. Generator embodiments of the invention can be used for numerous applications, including but not limited to: 1) monopropellant rocket engines, 2) bipropellant or hybrid rocket engines, 3) buoyancy engines for underwater vehicles, 4) monopropellant drivers for turbine emergency power units (EPUs), 5) sources of breathing gas for individuals, shelters, and land, sea, air and space vehicles; 6) operating pneumatic machinery; 7) providing heat for use as a sterilizing agent; 8) providing gas for inflating an inflatable structure; and 9) providing heat to a constrained environment. In each of these cases, the embodiments are particularly useful due to the high efficiency of the generator and portable sizes of the generator. Several illustrative uses are described below:

Monopropellant Engines

The embodiments of the present invention address both the storability and performance requirements of conventional liquid monopropellants. Nitrous oxide, $N_2O$, is not hazardous even if inhaled in high concentrations. Anesthetic effects of $N_2O$ can occur if it is breathed in very high (~65%) concentrations, but no ability-diminishing effects in humans have ever been observed at concentrations lower than 20%. There is no IDLH or OSHA permissible exposure limit (PEL) listed for $N_2O$. For comparison, OSHA recently reduced the PEL for hydrazine from 1 to 0.1 parts per million (ppm). Nitrous oxide is very stable at room temperature, and will not normally decompose spontaneously; thus, it is storable for extended periods of time, and is relatively easy to handle. Although its specific impulse is slightly lower (typically, 10 to 15% lower specific impulse performance) than that of hydrazine, these other operational considerations more than compensate, making nitrous oxide an attractive alternative to hydrazine for nearly all monopropellant applications.

In addition, since the decomposed reaction products of $N_2O$ contain a considerable amount of unreacted $O_2$, a hydrocarbon fuel can be introduced downstream of the decomposition reactor (preventing carbon fouling of the reactor bed) to boost $I_{sp}$ performance of the generator system to approximately 300 s. An engine configuration that maintains monopropellant-like plumbing and operational characteristics would be a hybrid engine, where the hot generator exhaust products are run through a solid hydrocarbon fuel grain (for example HTPB or polyethylene plastic) before exiting through a nozzle (the nozzle having the configuration as described above). In such a configuration, one would have bipropellant performance with the stability and safety handling characteristics of pure $N_2O$.

In terms of potential integration with an EVA system, the decomposition products of $N_2O$ provide an $O_2$ enriched air (33% $O_2$-67% $N_2$ vs. standard atmospheric air of 20% $O_2$ in a nitrogen-rich buffer gas) with proper management of $NO_x$ production. Based on similar $O_2$ partial pressures, a generator of the present invention could be run down to about 9 psia without $O_2$ enrichment.

Conventional liquid monopropellants are used in propulsion systems where simplicity of design, control on demand, and repeatability are desired. However, many monopropellants, such as hydrazine and hydrogen peroxide, are toxic and dangerous, adding to the complexity and cost of their utilization for satellite RCS systems and ruling them out completely for spacesuit thruster (EMU) application.

Liquid monopropellant engines, by their nature, have very simple propellant feed systems. The lack of multiple propellant feed systems and propellant-mixing requirements typically leads to very simple designs. Currently, monopropellant based engines are used extensively in propulsion systems where simplicity and small repeatable thrust impulse bits are required, such as in reaction control systems on spacecraft.

The most commonly used liquid monopropellant is hydrazine. Hydrazine is fairly stable in liquid form, and thus is relatively storable. It also has relatively good specific impulse for a liquid monopropellant. It is commonly used in attitude control systems of spacecraft, as previously mentioned. Unfortunately, hydrazine is extremely toxic to humans, and is hazardous to breathe or touch. Its toxicity makes it difficult, and thus expensive, to handle. Time consuming, complex, costly procedures must be used to fuel (ground process) rocket engines that use conventional hydrazine propulsion systems. These procedures have become so onerous, in fact, that they are materially adding to the cost and complexity of Atlas Centaur launch operations. (The Centaur uses hydrazine thrusters for tank settling during its long LEO-GEO coast). For EVA mobility applications, hydrazine is out of the question, since the exhaust plume would contaminate the astronaut's spacesuit and a tank leak during storage would endanger the entire spacecraft crew.

Hydrazine is also used as a monopropellant to drive some aircraft emergency power units (EPUs) such as that employed on the F-16. Its toxicity has caused many operational, safety, environmental, and regulatory problems in that application as well, so much so that the USAF has declared it a priority to eliminate hydrazine from the flight line.

Hydrogen peroxide was used in some simple liquid rocket systems. Decades ago, hydrogen peroxide was used in the rocket propulsion systems of some rocket-powered aircraft and as a gas generator propellant. Unfortunately, it has a relatively low specific impulse. Additionally, hydrogen peroxide is itself somewhat toxic and has a tendency to spontaneously decompose, making it difficult to handle safely and creating potential accident scenarios that could lead to the loss of the entire craft. Thus, hydrogen peroxide has limited use in modern monopropellant engine systems. For EVA applications hydrogen peroxide is patently unacceptable because the water vapor in the exhaust could frost out on helmet visors, leading to loss of vision for an astronaut.

In one embodiment of the invention, therefore, a $N_2O$ generator of the invention generates high energy gas from nitrous oxide, a readily available safe and storable propellant that is non-toxic, having performance comparable to hydrazine, and does not decompose spontaneously like hydrogen peroxide. The embodiment provides the use of the generator as a monopropellant engine, for example as a rocket engine. Incorporation of generator embodiments of the invention into rockets or other like vehicles would be known in the art, analogous to incorporation of conventional rocket engine features into a rocket.

Breathable Gas

In another embodiment of the invention, the decomposed $N_2O$ is converted into a breathable mix of oxygen and nitrogen. This particular use can be part of a mixed use, for example, using the generator for propulsion and for, when necessary, production of breathable gas. Thus, for example, an EMU propelled by a generator of the invention would provide an astronaut with a large emergency backup supply of oxygen. Such a dual or mixed use device has great utility as the propulsion system for manned spacecraft, such as the International Space Station, Space Shuttle, or Crew Exploration Vehicle, where safety is paramount and breathing gas reserves are desired. Breathable gas production is based on the generator of the present invention using modifications as described in U.S. Pat. No. 6,347,627 which is incorporated by reference in its entirety. Combination uses are termed "mixed uses" herein and can include a combined use of the $N_2O$ generator, noting the efficiency of being able to use one source of material ($N_2O$) for multiple purposes.

It is demonstrated herein, therefore, means of dissociating nitrous oxide into nitrogen and oxygen. ($2N_2O \Longrightarrow 2N_2+O_2$) (see U.S. Pat. No. 6,347,627 B1. In embodiments of the invention, the generator of the present invention improves upon this work by providing a much more compact and lightweight generator for driving such a nitrous oxide based oxygen supply system. In alternative embodiments of the invention, such as underwater, aircraft, or spacecraft, the generator can serve two or even three or more functions, including propulsion, power, and breathing gas, with all services drawing their supply from a common resource.

Emergency Power Units

Another embodiment of the invention is used to generate high energy gas to drive an aircraft emergency power unit. Currently there are over 3000 F-16's in service around the world, which use hydrazine decomposition gas generators to drive their emergency power units. However because of the extreme toxicity of hydrazine, which complicates operations through both risk to personnel and the need to comply with increasingly stringent safety and environmental regulations, the USAF has made decision to eliminate hydrazine from the flightline. Embodiments of this invention replace the hydrazine gas generator with a non-toxic alternative, the $N_2O$ based gas generator. Embodiments of the generator can be positioned as an emergency power unit which would be ignited in case of an emergency. In such embodiments, a pyrotechnic ignition may provide the most effective manner of igniting the nitrous oxide decomposition reaction. One illustrative embodiment would include a generator of the invention in an airplane where the generator would be ignited and used in case of an emergency engine shutdown. The generator would be small and have the capacity to use a small amount of $N_2O$, so would be easily integrated into most airplane designs.

Buoyancy Engine

In another embodiment of the invention, the $N_2O$ reactor is a buoyancy engine for underwater vehicles. The US Navy has a great interest in achieving silent underwater travel. One way to accomplish this is by repeatedly changing the buoyancy of an underwater glider, allowing it to glide up and down many times, thereby traveling long distances without the use of a propeller. The generator of the invention produces the buoyancy gas required for such a vehicle from a liquid storage reservoir, and its potential for producing high temperature gas adds to its efficiency by allowing a given mass of gas to displace a larger mass of water than would be possible using room-temperature buoyancy gas. Note that gas expelled from the generator of the present invention is used to blow ballast tanks. For example, in one test conducted at Pioneer Astronautics, 540 gm of $N_2O$ was used to produce hot gas with which to blow a 30 liter tank against a back pressure of 500 psi. This pressure is equivalent to that at 1122 ft (342 m) under the sea. The 540 gm of $N_2O$, stored at 20° C. could be contained within a 0.8 liter bottle with a rated pressure of 700 psi. In contrast, if compressed air were used to accomplish the same blowdown task, a 5 liter tank with a rated pressure of 3000 psi would have been required to store the required gas. The $N_2O$ system can thus provide the required gas for buoyancy change using a tank of $116^{th}$ the volume, $114^{th}$ the pressure, and $1124^{th}$ the mass of that needed by a system employing compressed air.

Hybrid Engine

Decomposition reaction products of $N_2O$ contain a considerable amount of un-reacted $O_2$. As a result, introduction of a hydrocarbon fuel source downstream of the decomposition reaction can be used to boost Isp (for example to 300 s). As such, embodiments of the present invention include adding hydrocarbon fuel into the gas exhaust of the generator embodiments of the present invention. In preferred embodiments, hydrocarbon is added to a generator exhaust to boost performance by positioning either a solid hybrid fuel grain or a liquid fuel injection system downstream of the generator.

The following examples are provided for illustrative purposes only and are not intended to limit the scope of the invention.

EXAMPLES

Example 1

Nitrous Oxide is Comparable to Hydrazine in Storage Characteristics

Figure 13:
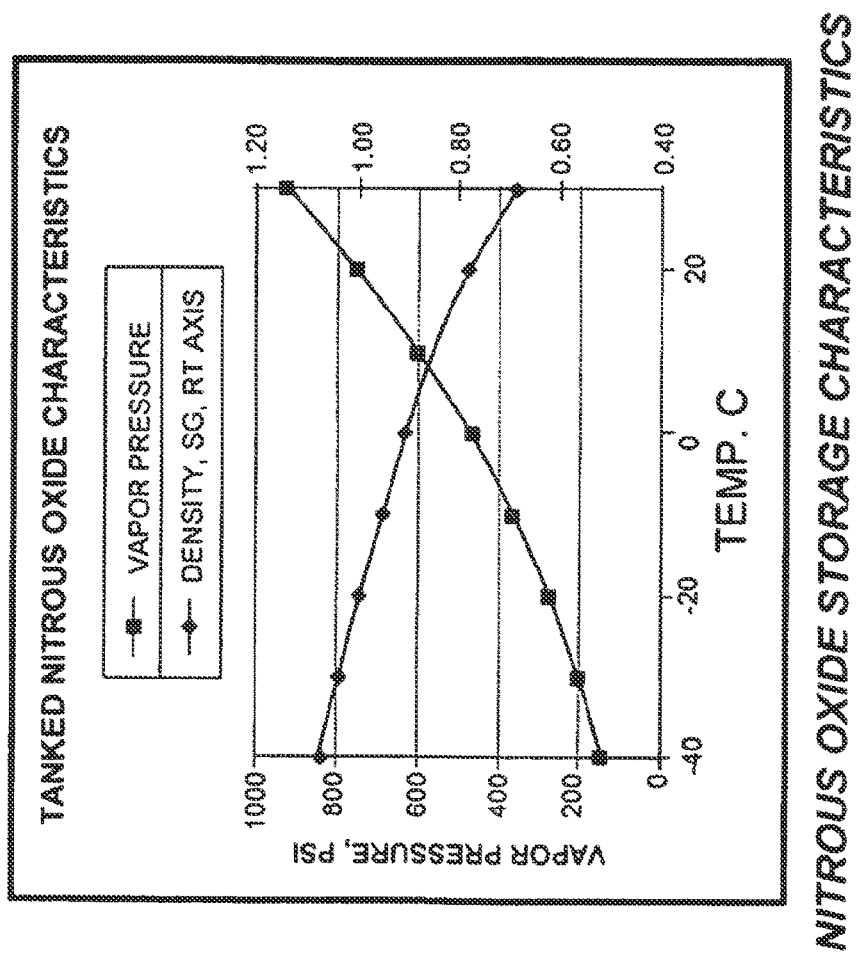
FIG. 13 illustrates the vapor pressure and density curve for $N_2O$ as a function of temperature.

FIG. 13 illustrates the vapor pressure and density curve for nitrous oxide ($N_2O$) as a function of temperature. The curve shows that $N_2O$ provides comparable thermal control to hydrazine: (1)—23° C., $N_2O$ has the same density as hydrazine (1.01 g/cc); (2) $N_2O$ has a heat of vaporization of 376 kJ/kg, therefore, starting at a worst case of 25° C., 10% of the $N_2O$ could be vented to bring the residual $N_2O$ down to −23° C., and (3) large insulated $N_2O$ tanks can be maintained at hydrazine storage densities by pressure relief boil-off (similar to the process in cryogen tanks) to get up to about 30% gain in storage density, the process could continue indefinitely to a worst-case self-regulating storage density of about 0.7 g/cc at 25° C.

Alternatively, $N_2O$ can be stored at room temperature, giving it a density, at 20° C., greatly exceeding that of cold gas. In addition, for example, unlike hydrazine which requires special loading operations for EVA propulsion, $N_2O$ provides safe and convenient ground loading, even allowing for last minute $N_2O$ loading just prior to launch.

The present example shows the utility of replacing hydrazine with $N_2O$ in applications conventionally performed by hydrazine.

Example 2

Figure 14:
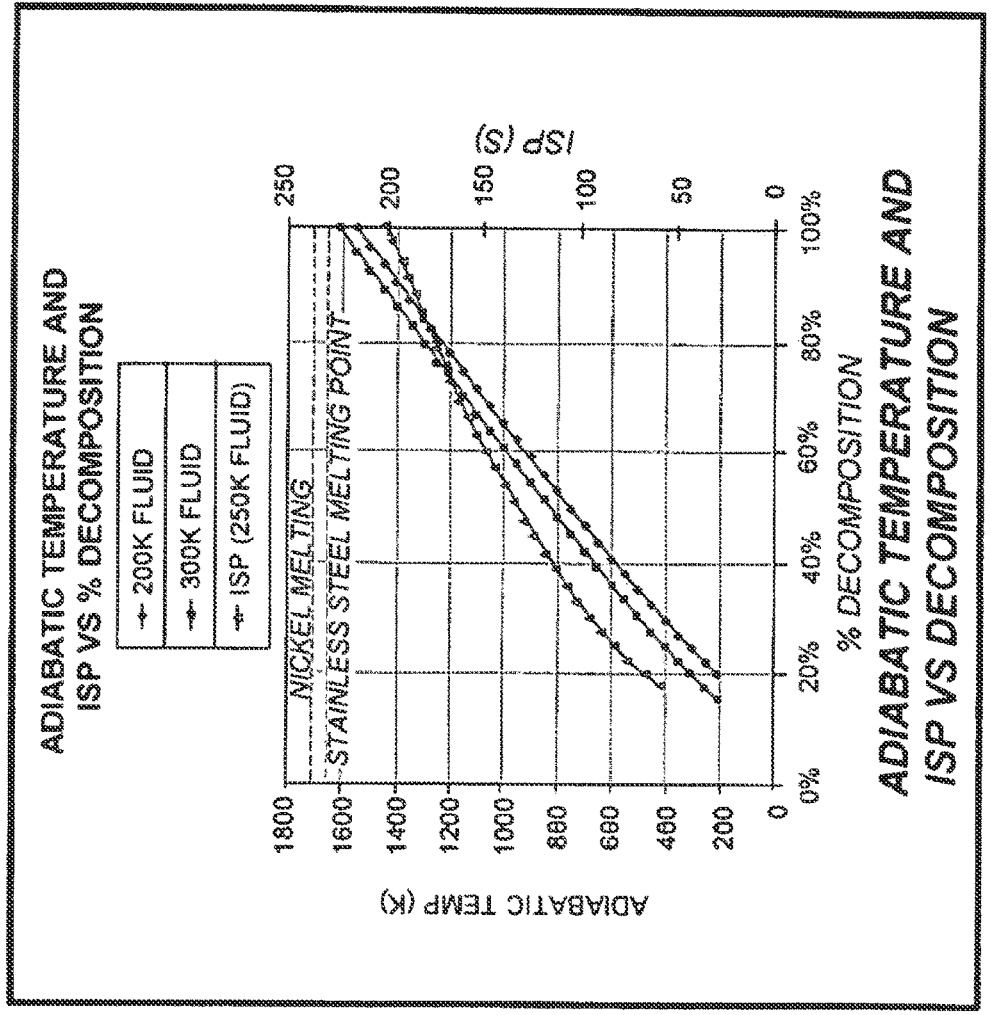
FIG. 14 illustrates adiabatic temperature and maximum theoretical Isp performance from decomposed $LN_2O$ as a function of percent decomposition and initial tank temperature.

Nitrous Oxide Decomposition as a Function of Adiabatic Temperature and Maximum Theoretical Isp FIG. 14 illustrates adiabatic temperature and maximum theoretical Isp performance from decomposed liquid nitrous oxide ($LN_2O$) as a function of percent decomposition and initial tank temperature. The enthalpy of reaction for $N_2O$ is 1855 kJ/kg; including the heat of vaporization loss (376 kJ/kg), the resultant available thermal energy release from $LN_2O$ is 1479 kJ/kg (410 Whr/kg). As such, 20% of the decomposition energy is required to vaporize the liquid nitrous oxide. Note that the melting point boundaries of the nickel and stainless steel are included in the graph for comparison.

The present example shows the utility of using nitrous oxide as a monopropellant.

Example 3

Increased Temperature Improves Decomposition of $N_2O$

Figure 15:
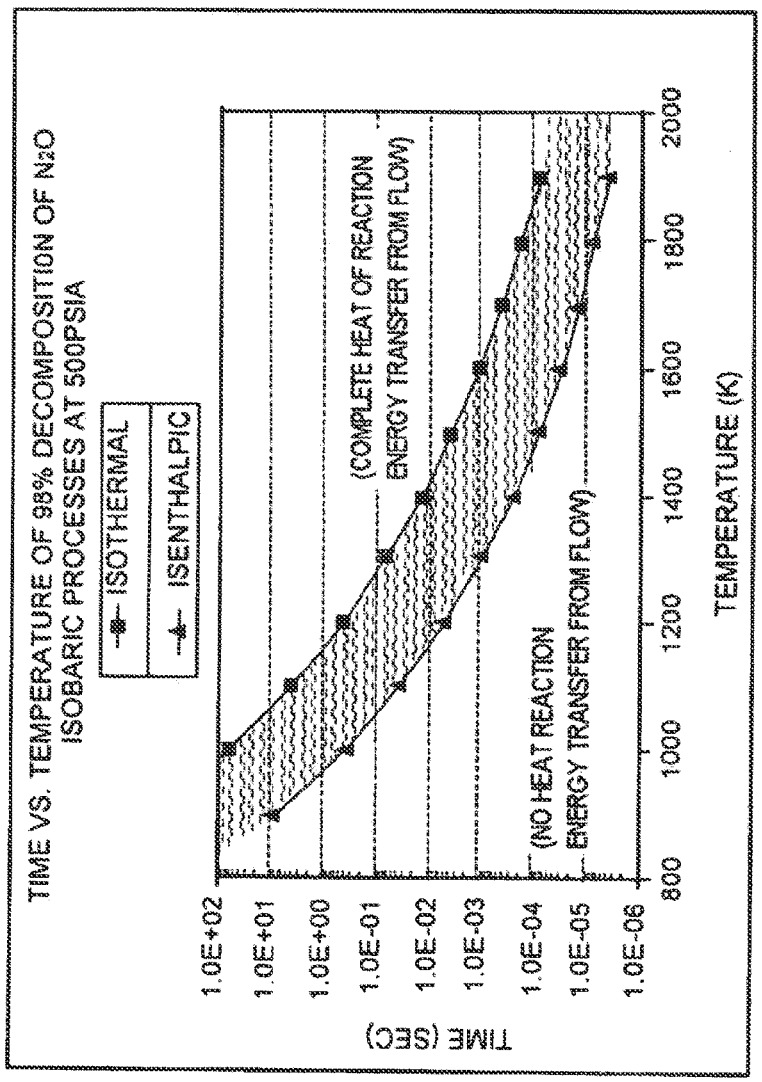
FIG. 15 illustrates the sensitivity of $N_2O$ decomposition time as a function of temperature for the two bounding cases of isothermal and isenthalpic flows.

FIG. 15 illustrates the improvement in $N_2O$ decomposition as a function of increasing temperature. FIG. 15 shows the sensitivity of decomposition time as a function of temperature for the two bounding cases of isothermal flow and more realistically, isenthalpic flow (decomposition times of milliseconds tend to not provide enough time to effectively transfer heat out of the flow). Thermal decomposition, therefore, appears to take off in the vicinity of 900° C. to 1,000° C. (elementary reactions for $LN_2O$ decomposition were collected and run in CHEMKIN (Sandia National Laboratories, 1996).

The thermal decomposition times for $N_2O$ versus its initial gas temperature shows that every 100° C. increase in temperature results in about 1 order of magnitude improvement in decomposition time. Therefore, the biggest improvement in decomposition times is associated with increasing the temperature of the incoming $N_2O$ prior to it hitting the reactor bed.

Other ways to improve $N_2O$ decomposition are generally associated with addition of catalyst.

The present example shows the utility of pre-heating the $N_2O$ prior to its entry into where it decomposes, i.e., reactor bed.

Example 4

Residence Time of $N_2O$ Must be Less than Reaction Time

FIG. 16 illustrates reaction time for $N_2O$ as a function of temperature in the presence of various catalysts. The residence time of $N_2O$ in a reactor device of the present invention (i.e., in the reactor's jacket) must be kept shorter than nitrous oxide's reaction time (i.e., in the reactor's reaction chamber). Conversely, as discussed above, the nitrous oxide must simultaneously spend enough time in the reactor device's jacket to warm-up in accordance with the preceding. The two conflicting requirements ($N_2O$ warm-up but not react) in the reactor's jacket are reconciled in embodiments of the devices described herein. For example, the jacket can be designed to maximize the heat transfer area of the reactor to allow greater $N_2O$ heating to occur within a very short residence time.

For example, with a total mass flow of 25 g/s, the reactor jacket interior volume is kept to 2.99 $cm^3$, which limits residence time of the gasified $N_2O$ to less than 3.5 milliseconds. This amount of time is shorter than the 50 milliseconds, i.e., the time required for the $N_2O$ to reach 900° C. As such, in one embodiment, the reactor jacket is designed to incorporate 40 grooves with a total surface area of 75 $cm^2$.

The present example illustrates the utility of providing a reactor jacket designed to increase the $N_2O$ temperatures without allowing decomposition in the jacket, but that allows decomposition in the reactor bed to proceed more efficiently.

Example 5

Magnesium Oxide and Nickel are Useful Fabrication of $N_2O$ Reactors of the Present Invention Hot $N_2O$ (and its dissociation products) creates an oxidizing environment harmful to the stability of most metals. The inventors have found that nickel is a resistant metal to the environment, i.e., slow to oxidize. Nickel has the added advantage of being thermally conductive (4 times as conductive as stainless steel), thereby making it a good material for use in fabricating reactor devices of the present invention. Therefore, nickel provides the dual benefit of withstanding $N_2O$ but being able to conduct heat through the reactor jacket, as discussed in Example 4.

In addition, nickel has a thermal expansion coefficient nearly identical to magnesium oxide (MgO). MgO coatings on nickel can therefore be durable under conditions of thermal cycling. Magnesium oxide, in turn, has a melting point above 3000 K and was tested by the present inventors to be highly resistant to oxidation to at least 2500 K.

The present example shows the utility of fabricating parts of the $N_2O$ reactor of the invention from nickel. Further, these nickel parts can be coated with MgO to provide addition protection from oxidation during $N_2O$ use.

Example 6

Isp of $N_2O$ is Comparable to Hydrazine and $H_2O_2$

The specific impulses of hydrazine, $N_2O$, and 98% hydrogen peroxide are compared in Table 1. These theoretical specific impulse data were obtained from the Phillips Laboratory AFALS equilibrium chemistry rocket specific impulse code, using a chamber pressure, $P_c$, of 100 psia and an expansion ratio, 8 of 50. As shown in Table 1, nitrous oxide has the potential to provide specific impulse (Isp) performance that is comparable to current industry standard monopropellants such as hydrazine and hydrogen peroxide.

TABLE 1

Comparison of Candidate Monopropellants ($P_c$ = 100 psia, $\epsilon$ = 50).

| Monopropellant | Chemical Formula | Isp (s) |
|---|---|---|
| Hydrazine | $N_2H_4$ | 220 |
| 98% Hydrogen Peroxide | $H_2O_2$ | 180 |
| Nitrous Oxide | $N_2O$ | 196 |

Any of the liquid monopropellants listed in Table 1 would offer greatly improved performance over the cold compressed gaseous nitrogen system used for propulsion on some satellites and current EMU systems. In contrast to these liquid monopropellants, the current cold nitrogen gas system offers a specific impulse of only 70 seconds, and offers a propellant mass fraction (defined as the mass of propellant divided by the mass of the tank required to hold it) that is about a factor of 20 worse. However the conventional monopropellants listed above, hydrazine and hydrogen peroxide, both have safety problems that have ruled them out for EVA propulsion application.

Example 7

Generator Embodiments are Effective at Blowing Ballast Tanks for Underwater Applications Generators can be advantageously used to blow ballast tanks of underwater vehicles. For example, in one test conducted by the inventors, 540 gm of $N_2O$ was used to produce hot gas which to blow a 30 liter tank against a back pressure of 500 psi. The production of the required gas by the generator was accomplished in about ten seconds. The system pressure was equivalent to that at 1122 ft (342 m) under the sea. The 540 gm of $N_2O$, stored at 20 C could be contained within a 0.8 liter bottle with a rated pressure of 700 psi. In contrast, if compressed air were used to accomplish the same blowdown task, a 5 liter tank with a rated pressure of 3000 psi would have been required to store the required gas. The $N_2O$ system can thus provide the required gas for buoyancy change using a tank of $1/16^{th}$ the volume, $1/14^{th}$ the pressure, and $1/124^{th}$ the mass of that needed by a system employing compressed air.

It will be clear that the invention is well adapted to attain the ends and advantages mentioned as well as those inherent herein. While a number of embodiments have been described for purposes of this disclosure, various changes and modifications can be made which are well within the scope of the invention. Numerous other changes may be made which will readily suggest themselves to those skilled in the art and which are encompassed in the spirit of the invention disclosure herein and as defined in the appended claims. All publications cited herein are incorporated by reference.

What is claimed is:

1. A method for nitrous oxide decomposition comprising:
   providing a gas generator comprising a reaction chamber, the reaction chamber having an interior and an exterior chamber wall, the interior chamber wall for constraining a nitrous oxide decomposition reaction and the exterior chamber wall defining a jacket between it and the interior chamber wall, the jacket at least partially enveloping the reaction chamber and defining one or more channels between the interior chamber wall and the exterior chamber wall, the one or more channels for transporting the nitrous oxide within the jacket into the reaction chamber;
   pre-heating incoming nitrous oxide in the jacket to a temperature of at least about 600° C. while minimizing the residence time of the nitrous oxide in the jacket, wherein the temperature and residence time of the nitrous oxide within the jacket facilitates cooling of the interior chamber wall;
   transporting the nitrous oxide within the jacket into the reaction chamber, wherein the temperature and residence time of the nitrous oxide within the reaction chamber facilitates the nitrous oxide decomposition; and
   releasing gas from the nitrous oxide decomposition from the reaction chamber.

2. The method of claim 1, wherein the gas generator further comprises a catalyst constrained within the reaction chamber.

3. The method of claim 2, wherein the catalyst constrained within the reaction chamber is selected from the group consisting of rhodium, ruthenium, platinum, magnesium oxide and zirconium oxide.

4. The method of claim 1, wherein the reaction chamber further comprises a screen for constraining a catalyst within the reaction chamber.

5. The method of claim 4, wherein the screen is composed of zirconia or sodium zirconium phosphate.

6. The method of claim 4 wherein the screen has one or more channels therethrough, the channels through the screen fluidly connected to the one or more channels formed in the jacket wherein the channels through the screen contribute to cooling of the screen.

7. The method of claim 1, wherein the one or more channels are grooves formed in the surface of the interior chamber wall.

8. The method of claim 1 wherein the one or more channels are grooves formed in the surface of the exterior chamber wall.

9. The method of claim 1, wherein the gas generator further comprises a nozzle operatively connected to the reaction chamber for control of the gas release from the reaction chamber.

10. The method of claim 9, wherein the nozzle has a convergence zone, a throat and a divergence zone wherein the convergence zone concentrates the gas flow, the throat controls the gas flow rate and the divergence zone accelerates the velocity of the gas released from the nozzle throat.

* * * * *